＃US009836372B1

(12) United States Patent
Khan et al.

(10) Patent No.: US 9,836,372 B1
(45) Date of Patent: Dec. 5, 2017

(54) DEVICE VERIFICATION SYSTEM WITH FIRMWARE UNIVERSAL VERIFICATION COMPONENT

(71) Applicant: Maxim Integrated Products, Inc., San Jose, CA (US)

(72) Inventors: Neyaz Khan, Plano, TX (US); Madhavi Kulkarni, Dallas, TX (US)

(73) Assignee: MAXIM Integrated Products, Inc., San Jose, CA (US)

( * ) Notice: Subject to any disclaimer, the term of this patent is extended or adjusted under 35 U.S.C. 154(b) by 200 days.

(21) Appl. No.: 14/624,486

(22) Filed: Feb. 17, 2015

Related U.S. Application Data

(60) Provisional application No. 61/940,369, filed on Feb. 14, 2014.

(51) Int. Cl.
  *G06F 11/00* (2006.01)
  *G06F 11/26* (2006.01)
  *G06F 11/36* (2006.01)

(52) U.S. Cl.
  CPC .......... *G06F 11/26* (2013.01); *G06F 11/3604* (2013.01)

(58) Field of Classification Search
  CPC .... G06F 11/26; G06F 11/261; G06F 11/3604; G06F 17/5022; G01R 31/31702; G01R 31/3181; G01R 31/31707; G01R 31/3177; G01R 31/318385
  See application file for complete search history.

(56) References Cited

U.S. PATENT DOCUMENTS

| | | | |
|---|---|---|---|
| 6,996,799 B1 * | 2/2006 | Cismas et al. | G06F 17/5045 703/14 |
| 8,504,344 B2 * | 8/2013 | Hall | G06F 11/261 703/13 |
| 8,639,487 B1 * | 1/2014 | Ezer et al. | G06F 17/505 703/13 |
| 8,832,622 B1 * | 9/2014 | Xu et al. | G06F 17/5022 716/106 |
| 9,582,458 B2 * | 2/2017 | Gavis | G06F 17/5081 |

(Continued)

OTHER PUBLICATIONS

Universal Verification Methodology (UVM) 1.1 User's Guide, May 18, 2011, Accellera, entire document.*

(Continued)

*Primary Examiner* — Marc Duncan
(74) *Attorney, Agent, or Firm* — TIPS Group

(57) ABSTRACT

A device verification system includes a device under test (DUT) including digital logic and a plurality of digital memories coupled to the digital logic; a plurality of hardware Verification Intellectual Property (VIP) modules coupled to the DUT to verify hardware of the DUT; and a plurality of software VIP modules coupled to the DUT to verify firmware of the DUT. A method for verifying the functionality of a device under test includes automatically developing code segments representing a series of firmware test patterns with a software Verification Intellectual Property (VIP) module; transferring code segments representing the series of firmware test patterns into a digital memory of a device under test (DUT) that includes digital logic; and monitoring the functional operation of the DUT as it uses the digital logic to execute the code segments representing the series of firmware test patterns stored in digital memory.

12 Claims, 4 Drawing Sheets

(56) References Cited

U.S. PATENT DOCUMENTS

| | | | |
|---|---|---|---|
| 9,612,277 B2* | 4/2017 | John | G01R 31/318513 |
| 9,689,921 B2* | 6/2017 | Hamid | G01R 31/3177 |
| 9,710,427 B2* | 7/2017 | Goryachev | G06F 9/5077 |
| 2010/0082315 A1* | 4/2010 | Hall | G06F 11/261 |
| | | | 703/13 |
| 2015/0019193 A1* | 1/2015 | Boutillier et al. | G06F 17/5036 |
| | | | 703/14 |
| 2015/0294061 A1* | 10/2015 | Arbel et al. | G06F 17/5022 |
| | | | 716/112 |

OTHER PUBLICATIONS

Aynsley, John, UVM Verification Primer, Jun. 2010, Doulos, pp. 1-4.*

Cerisier, Francois and Markus Winterholer, Metric Driven Hardware/Software Co-Verification of Interrupt and IPC Driven Firmware Sub-Systems, Oct. 2-3, 2012, SAME Conference, pp. 1-6.*

Cadence Interoperability Guide, 2008, Cadence, pp. 1-24.*

Andrews, Jason, Coverage Driven Methodology for Verification of SoC Hardware and Software Corner Cases, no date available, Cadence Design Systems, pp. 1-17.*

System on a Chip, Dec. 14, 2013 (snapshot), Wikipedia, pp. 1-3.*

* cited by examiner

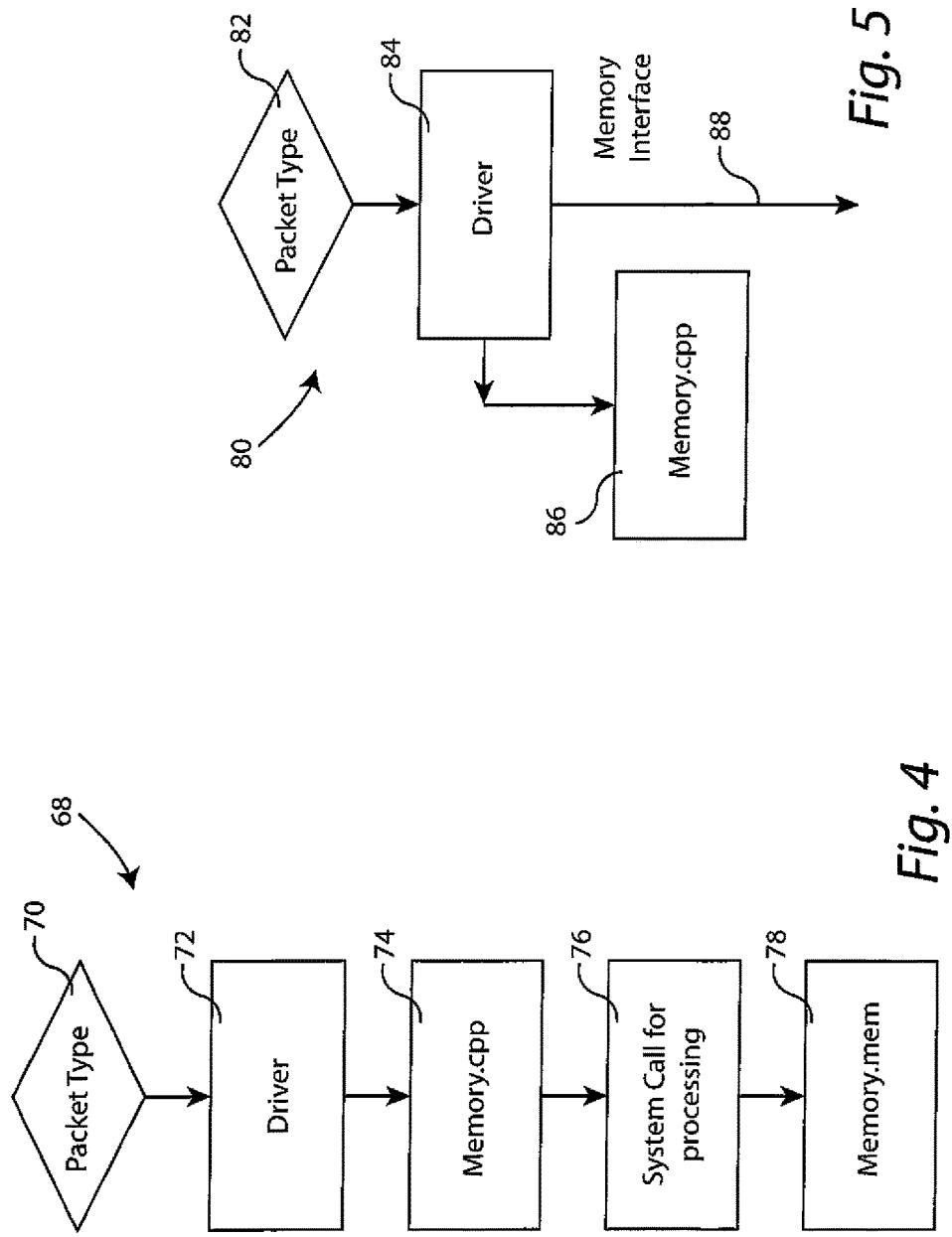

DEVICE VERIFICATION SYSTEM WITH FIRMWARE UNIVERSAL VERIFICATION COMPONENT

BACKGROUND

A system on a chip or system on chip (SoC or SOC) is an integrated circuit (IC) that integrates all components of a computer or other electronic into a single chip. It may contain digital, analog, mixed-signal and radio-frequency function on a single chip substrate. A typical application for a SoC is in the area of embedded systems.

A typical SoC have a number of "blocks" including a microcontroller, microprocessor or DSP core(s), memory blocks including a selection of ROM, RAM, EEPROM and flash memory, timing blocks including oscillators and phase-locked loops, and input and/or output (I/O) interfaces. SoC also often have blocks including voltage regulators, power management systems, and "peripherals" such as counter-timers, real-time timers, power-on reset generators. Common digital interfaces include USB, FireWire, Ethernet, USART and SPI, and common analog interfaces include analog-to-digital converters (ADC) and digital-to-analog (DAC) converters.

The blocks of a SoC are connected by either a proprietary or industry-standard bus such as the AMBA bus from ARM Holdings. DMA controllers are used to route data directly between external interfaces and memory, bypassing the processor core and thereby increasing the data throughput of the SoC.

In addition to the hardware described above, a SoC includes internal software (often referred to as "firmware") to control the microcontroller, microprocessor or DSP cores, the peripherals and the interfaces. Most SoCs are developed from pre-qualified hardware for the hardware elements described above, together with firmware drivers that control their operation. Of particular importance are the protocol stacks that drive industry-standard interfaces like USB. The hardware blocks are put together using CAD tools and the firmware modules are integrated using a software-development environment.

A SoC (a/k/a device under test or "DUT") is verified for logical and functional correctness before being sent to foundry. This process is called functional verification and it accounts for a significant portion of the time and energy expended in the chip design life cycle. In everyday terms, functional verification attempts to answer the question "Does this proposed design do what is intended?" This is a complex task, and takes the majority of time and effort in most large electronic system design projects. Functional verification is very difficult because of the sheer volume of possible test cases that exist in even a simple design. Frequently there are more than $10^{80}$ possible tests to comprehensively verify a design—a number that is impossible to achieve in a lifetime.

The most intricate parts of the design have been traditionally checked manually by the verification engineers without the use of automation. For example, in a microprocessor, handshaking occurs between the instructions executed from the preloaded memory and the peripherals that are involved in the data transfer. That exchange of information is usually verified manually by probing for the internal signals in the design. Either the source code is checked or the waves produced from each simulation are visually inspected. This manual inspection can never be a part of an automatic regression suite, so one or more engineers must always perform this error prone task every time the device needs to be verified. This takes a long time especially if the processor has a large instruction code database and supports several peripherals based on different bus protocols.

Engineers have also employed simulation acceleration, emulation and/or a Field Programmable Gate Array (FPGA) prototype to verify and debug both hardware and software for SoC designs prior to tape out. With high capacity and fast compilation time, acceleration and emulation are powerful technologies that provide wide visibility into systems. Such technologies, however, operate slowly, on the order of MHz, which may be significantly slower (e.g. up to 100× slower) than the SoCs operating frequency. Acceleration and emulation boxes are also very large and expensive at $1M+. FPGA prototypes, in contrast, use FPGAs directly to enable engineers to validate and test at, or close to, a system's full operating frequency with real-world stimulus. Tools such as Certus are used to insert probes in the FPGA RTL that make signals available for observation. This is used to debug hardware, firmware and software interactions across multiple FPOA with capabilities similar to a logic analyzer. However, such systems are expensive and hard to automate.

Traditional approaches to verifying designs with software and hardware components typically involve writing numerous directed test cases in either "C" or assembly language. Randomization of the design's stimulus is very limited, or completely non-existent, making it difficult to achieve full range of functional coverage automatically, which limits checking the accuracy of the design, especially in obscure "corner" cases. For example, a microprocessor's complexity may reside in the fact that it is capable of supporting data transfer between several different peripherals in a non-deterministic and random fashion. In a traditional directed test-case approach, an engineer writes assembly code sequences for each desired sequence of events, translates them into data to be used in a preloaded memory file and then runs simulations would serially execute through the sequence of programmed events.

In the directed test-case methodology, test cases are hardcoded, and there is no randomization. While this manual process works, it is very labor intensive, limited and not very efficient. The engineer has to try to think of all the possible scenarios of code execution and then manually program them into multiple test-cases, resulting in a very tedious and sometimes error prone operation. Since only the sequences provided in the test-cases are verified and only one peripheral is accessed at a time, many areas of the design may be overlooked. Therefore, due to the vast functional state space, it is much more likely than not that the device will never be fully exercised using such prior art techniques. In other words, functional test coverage of the device will be low and the risk of having to redesign or "re-spin" the DUT will be high.

The legacy verification environment requires manually coding assembly code files with a sequence of instructions for a desired test. In the prior art, the file is processed by an engineer to generate a memory file which is preloaded into the environment prior to running a simulation. The preloaded file is read with a "readmemh" (read memory in hexadecimal) command for extracting its contents. Since the assembly code file contains the instructions needed to test a particular sequence, the information is not known outside of that file and reuse cannot be leveraged from peripheral to peripheral. Also, only one valid instruction sequence is tested at a time per simulation and peripheral. The same code must be replicated for each of the processor's peripherals and tests. Performing redundant work wastes an engineer's time and extends a project's schedule immeasurably. Also, random testing is not included, and the random tests may be the most powerful in catching those hard to find bugs in the microprocessor and at the fastest rate.

These and other limitations of the prior art will become apparent to those of skill in the art upon a reading of the following descriptions and a study of the several figures of the drawing.

SUMMARY

In an embodiment, set forth by way of example and not limitation, a method for testing a device under test (DUT) includes: a) developing a set of test constraints; b) randomizing a set of variables within the test constraints; and c) developing a series of test patterns which are written into a non-transient memory of the DUT to verify the firmware of the DUT.

In an embodiment, set forth by way of example and not limitation, a method of verifying a device under test (DUT) includes automatically generating a test program on a processor, and automatically executing the test program to test patterns into non-transient memory of the DUT to verify the firmware of the DUT.

In an embodiment, set forth by way of example and not limitation, a Firmware Universal Verification Component (UVC) generates software subroutines to create random sequences of instructions, checks the validity of those instruction sequences, and then measures their coverage in simulations. In this non-limiting example, the Firmware UVC is substantially UVM compliant. This enables the VIP module to be instantiated and used in a UVM environment like any standard UVC, thus promoting reuse.

In an embodiment, set forth by way of example and not limitation, a Firmware UVC can also generate assembly code, process it, and create an output file containing memory information to be preloaded into simulations. It can generate random instructions and convert them into the address, data, and control information needed to drive each memory port. It can have a driver and/or a monitor to check the validity of instructions and hence can be used in either active or passive mode.

In an embodiment, set forth by way of example and not limitation, a UVC is built in software to verify a microprocessor with embedded code of a System-On-A-Chip (SoC). In this embodiment, the UVC provides software subroutines to create random sequences of instructions, checks the validity of those instruction sequences, and then measures their coverage in simulations. It follows the UVM methodology and the structure of the IP is fully UVM compliant. This enables the VIP module to be instantiated and used in a UVM environment like any standard UVC, thus promoting reuse.

In an embodiment, set forth by way of example and not limitation, a device verification system includes a device under test (DUT) having digital logic and a plurality of digital memories coupled to the digital logic, a plurality of hardware Verification Intellectual Property (VIP) modules coupled to the DUT to verify hardware of the DUT, and a plurality of software VIP modules coupled to the DUT to verify firmware of the DUT. In an example embodiment, at least one of the software VIP modules is a Firmware Universal Verification Component (UVC) that is compliant with Universal Verification Methodology (UVM).

In an embodiment, set forth by way of example and not limitation, a device verification system includes: a device under test (DUT); an Interface UVC coupled to the DUT; a Test Bench & Handshake component coupled to the DUT and the Interface UVC; a Reference Model component coupled to the DUT and the Interface UVC; a Firmware UVC coupled to the Test Bench & Handshake component, the DUT and the Reference Model component; and a Coverage component coupled to the Firmware UVC. In this example, the Firmware UVC includes a Master Agent having a system interface, and a Master Sequence Library coupled to the Master Agent.

In an embodiment, set forth by way of example and not limitation, a method for verifying the functionality of a device under test includes: a) automatically developing code segments representing a series of firmware test patterns with a software Verification Intellectual Property (VIP) module; b) transferring code segments representing the series of firmware test patterns into a digital memory of a device under test (DUT) that includes digital logic; and c) monitoring the functional operation of the DUT as it uses the digital logic to execute the code segments representing the series of firmware test patterns stored in digital memory. In this example, the software VIP module is preferably compliant with Universal Verification Methodology (UVM) such that the software VIP module comprises a reusable Firmware Universal Verification Component. In an embodiment, the test patterns are dynamically modified based upon the monitoring operation.

It will be appreciated that an advantage of certain example embodiments is that a Firmware UVC using a constrained randomization approach and UVM methodology can be effectively used to verify microprocessor instruction sets.

It will also be appreciated that an advantage of certain example embodiments is that any design that uses a microprocessor can use a Firmware UVC to create generic function calls based on instruction sets. In such example embodiments, random and/or directed UVM sequences are based on the function calls to verify the accuracy of the design.

Other advantages of example embodiments include one or more of:

Firmware UVCs enable the randomization of instruction sets.

Firmware UVCs automate simulation processes and checks that are performed manually. When used with Instruction Set Simulator (ISS) and constrained random instruction generation, 100% functional coverage of instruction sets is achieved in much less time.

When used at the SoC level, the SoC design verification engineer does not need to know all the details about the instruction set in order to use it which increases the ramp up rate for each project.

Being able to use a reusable test suite for each peripheral makes building a test bench for microprocessor based applications much faster.

The coverage code, assertions, and vPlan created for the Firmware UVC can be reused at the system level testing.

These and other embodiments, features and advantages will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIG. 4 is a flowchart illustrating an example Firmware UVC process during an end_of_elaboration UVM phase;

FIG. 5 is a flowchart illustrating an example Firmware UVC process during an end_of_elaboration UVM phase.

DETAILED DESCRIPTION OF EXAMPLE EMBODIMENTS

In certain non-limiting examples, reusable verification components referred to herein as "Universal Verification Components" or "UVC" are built upon a foundation of the Universal Verification Methodology (UVM), standardized methodology for verifying IC designs. See, for example, *Universal Verification Methodology (UVM)* 1.1 *User's Guide*, Accellera, May 18, 2011, which is incorporated herein by reference in its entirety.

Universal Verification Methodology is derived mainly from the Open Verification Methodology (OVM) which was, to a large part, based on the eReuse Methodology (eRM) for the eVerification Language developed by Verisity Design in 2001. The UVM class library brings much automation to the SystemVerilog language, such as sequences and data automation features (packing, copy, compare) etc. and is an Accellera standard with support from multiple vendors. As well known to those of skill in the art, System Verilog is a combined hardware description language (HDL) and hardware verification language (HVL) based upon extension of Verilog, which was standardized as an HDL in IEEE 1364, incorporated herein by reference.

In an embodiment, set forth by way of example and not limitation, a Firmware UVC is built to verify a microprocessor with embedded code ("firmware") of a System-On-A-Chip (SoC). In this embodiment, the UVC provides subroutines to create random sequences of firmware instructions, checks the validity of those instruction sequences, and then measures their coverage in simulations. By following the UVM methodology, the example Firmware UVC remains UVM compliant. This enables the software VIP module implementing the Firmware UVC to be instantiated and used in a UVM environment like a traditional UVC, thus promoting reuse.

In a non-limiting example, the Firmware UVC generates assembly code, processes it, and creates an output file containing memory information to be preloaded into internal memory of a DUT as firmware to provide functional simulations. In certain embodiments, it generates random instructions and converts them into the address, data, and control information needed to drive each memory port. In still further alternate embodiments, a driver and/or a monitor to checks the validity of instructions, such that it can be used in either an active or a passive mode. The benefits and uses for certain example embodiments for Firmware UVCs are described in more detail below.

Figure 1:
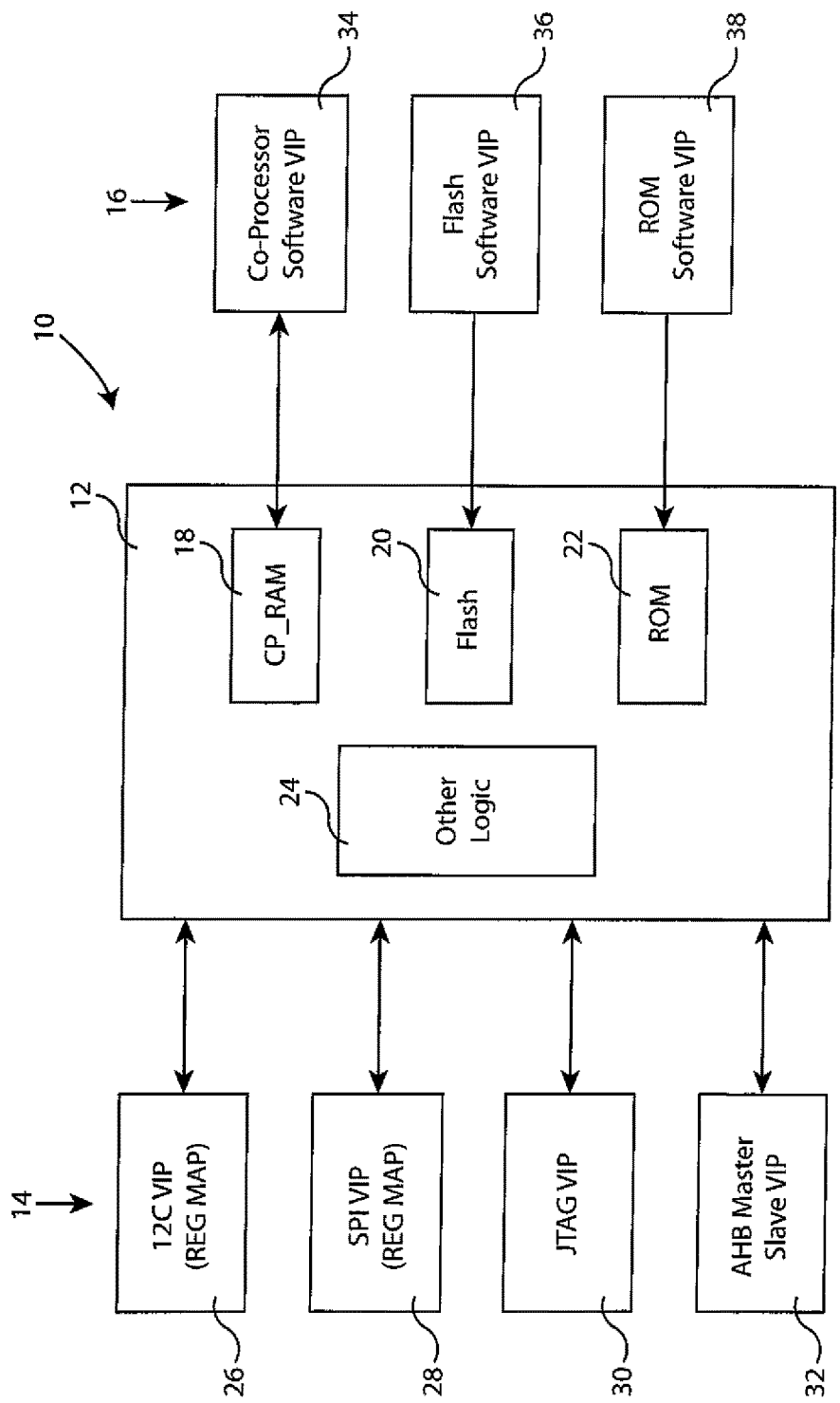
FIG. 1 is a block diagram of an example test bench including Firmware UVC used for microprocessor verification.

FIG. 1 is a block diagram of an example test bench 10 including, in this non-limiting example, a microprocessor or other DUT 12, a number of hardware Verification Intellectual Property (VIP) modules 14, and a number of software VIP modules 16. In this non-limiting example, DUT 12 includes memory (CP_RAM) 18, memory (Flash) 20 and memory (ROM) 22, as well as other logic 24. The hardware VIP modules 14 include, by way of non-limiting examples, I2C VIP (REG_MAP) module 26, SPI VIP (REG_MAP) module 28, JTAG VIP module 30 and AHB Master/Slave VIP module 32. The hardware VIP modules 14 are used to verify hardware aspects of the DUT 12 by, for example, placing and reading signals on pins of the DUT 12. The software VIP modules 16 include, by way of noi-limiting examples, Co-Processor software VIP module 34, Flash software VIP module 36 and ROM software VIP module 38. The software VIP modules 16 are used to verify the firmware (e.g. hardware-embedded microcode, routines, software, drivers, etc.) of the DUT. It will be appreciated that the purpose of test bench 10 is to provide stimulus (both hardware and software) to verify that the DUT 12 will operate properly. It should be noted that the DUT can be either a combination of hardware and firmware, or it can be a software simulation of the DUT.

As used herein, when the software VIP modules 16 are compliant with UVM they are alternately referred to as Firmware Universal Verification Component (UVC). In this non-limiting example, Firmware UVCs are reusable, reconfigurable and modular ("self-contained"). Each of the Firmware UVCs automate the creation of a test generation program, and automatically write the test patterns into the internal memory of the DUT 12. It should be noted that the UVCs can be reactive and/or adaptive, such that the test patterns can be changed dynamically based upon the DUT response, which is a distinct advantage over a fixed stimulus from a manual testing of a DUT, as was done in the prior art.

The example test bench 10 of FIG. 1 includes a microprocessor 12 with a Flash memory 20, a ROM 22 for a boot sequence, and co-processor RAM (CP_RAM) 18. It also has peripherals based on I2C, SPI, and JTAG protocols. As well known to those of skill in the art, an I2C (or "I$^2$C") protocol defines an implementation of a multi-master, multi-slave, single-ended, serial computer bus; a Serial Peripheral Interface (SPI) protocol specifies a synchronous serial communication interface bus used for short distance communication (e.g. in embedded systems); and a Joint Test Action Group (JTAG) protocol provides test methodologies for printed circuit boards, integrated circuit (IC) debug ports, etc. Each interface protocol has its own set of registers inside the processor. An important function of the microprocessor (processor) is to move data from a memory to a register or from a register to another register. Data can also be moved from a memory to another memory. In certain example embodiment, source data for these instructions are stored in registers and memory and/or are provided as part of the operational code (opcode) firmware.

Figure 2:
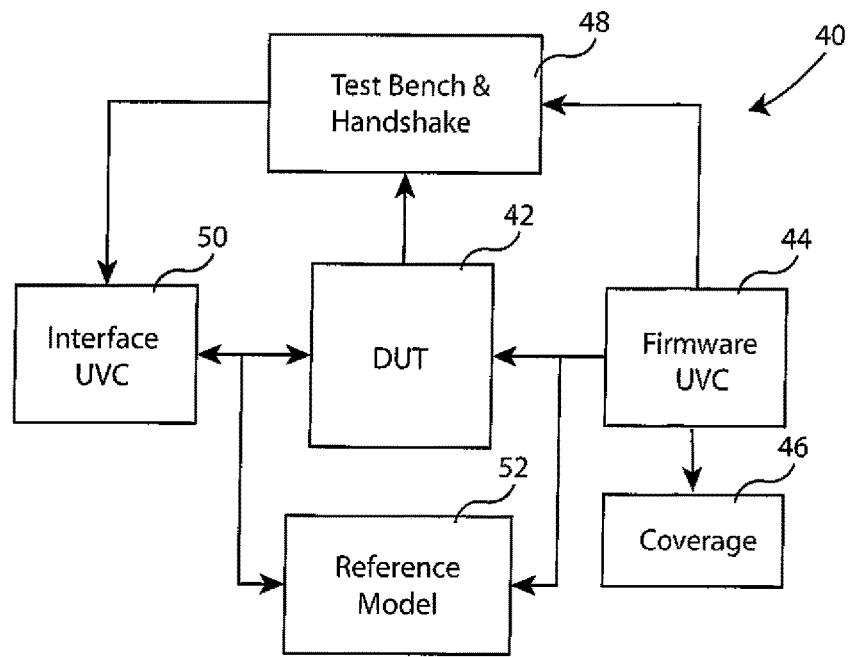
FIG. 2 is a block diagram of an example Firmware UVC for I2C verification.

In FIG. 2, is a block diagram illustrating, by way of example and not limitation, a test bench 40 with a Firmware UVC for I2C verification. A DUT 42 receives test data from Firmware UVC 44, as does a Coverage block 46. A Test Bench & Handshake block 48 receives data from both the DUT 42 and the Firmware UVC 44 and provides an input to Interface UVC 50, which is in bidirectional communication with DUT 42. Reference Model 52 receives data from DUT 42, Firmware UVC 44 and Interface UVC 50 for comparison purposes.

Figure 3:
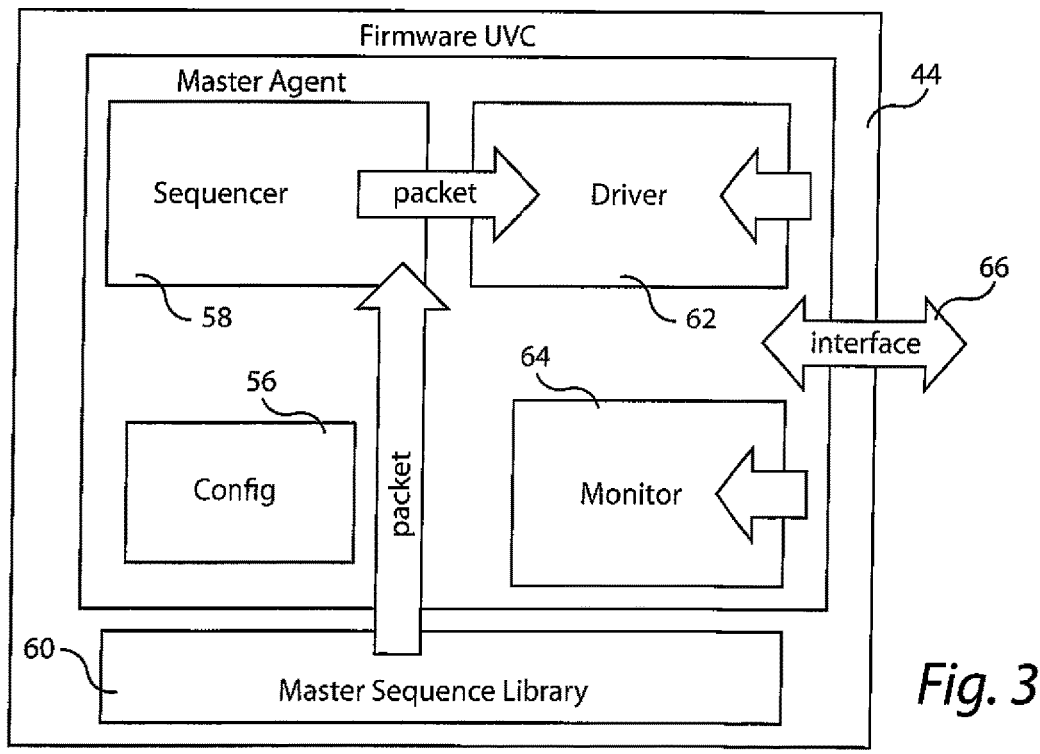
FIG. 3 is a block diagram illustrating an example Firmware UVC architecture.

FIG. 3 is a block diagram illustrating, by way of example and not limitation, an example Firmware UVC architecture 44 including a "config" block 56, a Sequencer 58, a Master sequence library 60, a Driver 62, a Monitor 64 and an interface 66. At the start of a stimulation, code is automatically generated to be written into the memory of the DUT. With additional reference to FIG. 2, once the processor of the DUT realizes that there is code to process it reads the code from memory and acts accordingly. The test bench and handshake block 48 performs timing and coordination functions. Coverage block 46 ensures that all instructions are covered during the randomized test process.

FIG. 4 is a flowchart illustrating an example Firmware UVC process 68 during an end_of_elaboration UVM phase. As is well known to those of skill in the art, UVM components execute their behavior in strictly ordered, pre-defined phases. Each phase is defined by its own virtual method, which derived components can override to incorporate component-specific behavior. By way of non-limiting examples, the phases can comprise: build→connect→end_of_elaboration→start_of_simulation→run→extract→check→report. Since the preloaded file needs to be ready before the simulations starts, the driver calls all the functions in the end_of_elaboration phase of the simulation. This ensures that the preloaded file is ready before "readmemh" is called from the memory model.

The process 68 includes the operations of determining a Packet Type 70, implementing a Driver 72, creating a Memory .cpp 74, developing a System Call for Processing 76 and a Memory.mem 78. In this non-limiting example, the Firmware UVC process 68 generates assembly code as a preloaded file for memory, e.g. a Firmware UVC is created which generates an assembly code file (memory .cpp) using functions that define sequences of instructions.

As is well known to those of skill in the art, the .ccp suffix for the file indicates that the source file is a C++ file. In this non-limiting example, a set of instructions for each function is created in C++ such that it can be reusable in multiple tests. Example commands include "move", "copy", and "jump". For example, if the processor is setting an I2C peripheral as a master, it needs to execute a certain sequence of instructions to configure itself as a slave and the peripheral as a master. It will also need to program master and slave addresses and enable I2C mode. These sequence of instructions can be reused for other test application.

A function written for the above sequence can be reused anytime data is transferred between the I2C and memory. In this example, Firmware UVC driver has the necessary functions to create a constrained random or directed sequence of instructions. The packet has enumerated type definitions for different types of verification, such as I2C master transmit and I2C slave receive. Based on the type of packet in the sequence, the driver generates an assembly code (memory .cpp) file which is then processed using a system call from System Verilog to generate a preloaded file, in this non-limiting example.

Before starting any I2C transactions, the I2C VIP module and processor waits for the I2C to be configured, in this non-limiting example. As will be appreciated by those of skill in the art, this implies handshakes between the Firmware UVC, test bench and the I2C Hardware UVC. In the present example, the I2C Hardware UVC is used to access data in a transmit and receive first-in, first-out ("FIFO") buffer. When the I2C peripheral is a master, the I2C VIP module waits until the processor executes instructions to set the I2C peripheral as a master. It also waits until the receive FIFO buffer is loaded with data before starting I2C transactions, in this non-limiting example. This can be achieved by snooping on the memory interface to look for certain instructions (address and data combinations) and generating an event that can be monitored by I2C VIP module interface.

It will be appreciated that, since this approach is using preloaded memory, any command that needs to be tested has to be part of memory .cpp file. This limits control over the command execution. The advantage of this approach is in the reusability of the memory .cpp file in the functional design verification as well as in the lab and tester environment. The same ".cpp" file can be used in all three environments, and any problems occurring post-silicon can be recreated quickly.

FIG. 5 is a flowchart illustrating an example Firmware UVC process 80 during an "end_of_elaboration" UVM phase. The process 80 includes a Packet Type block 82, a Driver 84, a Memory .cpp 86, and a Memory Interface 88. The process 80 generates memory input data. In this approach, the packet is defined as an instruction with address and data that is driven into memory. A set of constraints is defined to make sure that each sequence and the content of the instructions is valid. The Firmware UVC configuration defines what type of peripheral or data transfer needs to be tested and, based upon that, a constrained random sequence of instructions is generated, and data is driven into memory.

The described example approach of FIG. 5 provides a Firmware UVC full control over the execution of instructions. If the microprocessor is active as a slave with the I2C peripheral as a master, then the Firmware UVC can wait for the interrupt to be generated after the master request before it responds with data. A memory .cpp file is created in this approach as well by writing assembly code for executing instructions in the file. This helps maintain reusability in the lab and on the tester.

Figure 6:
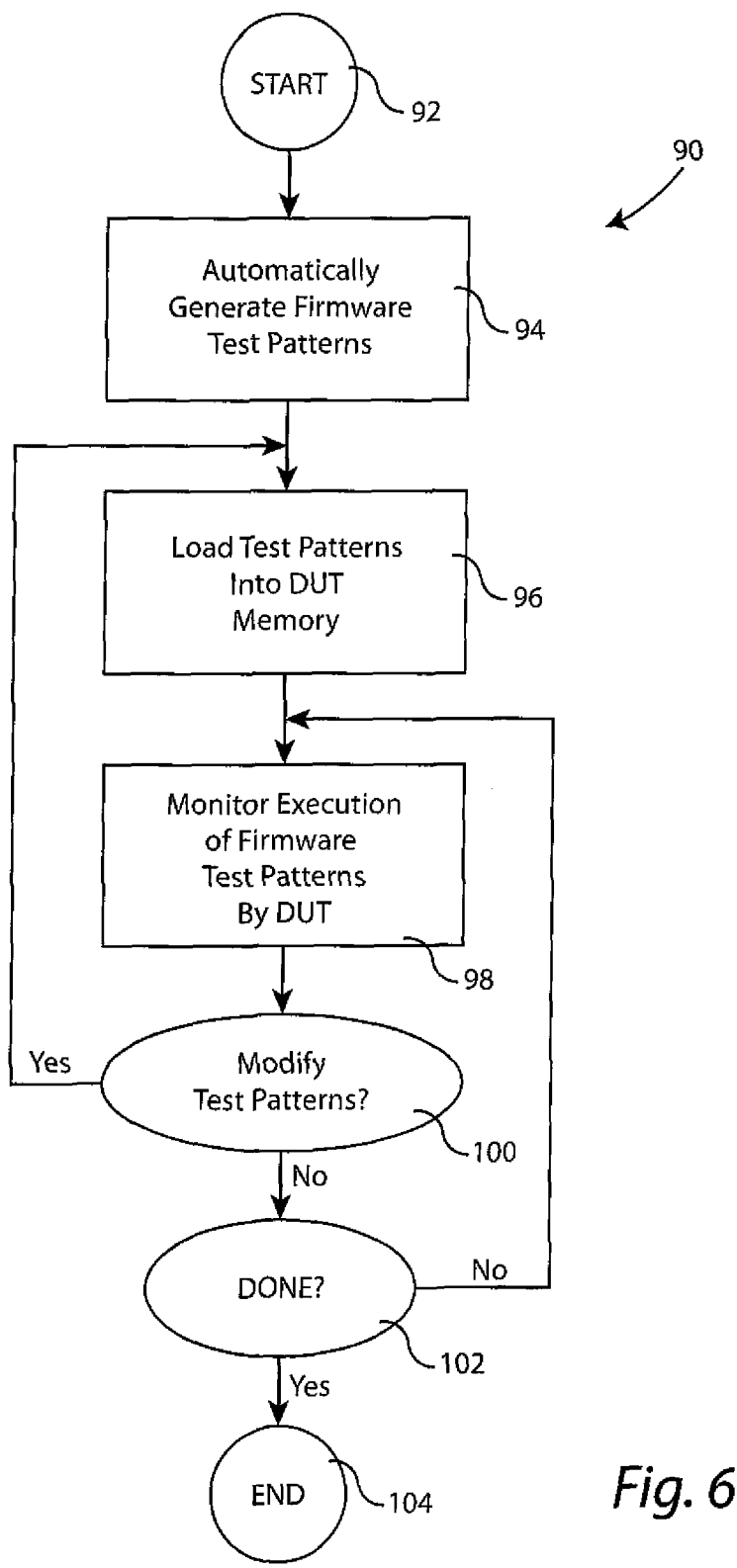
FIG. 6 is a flow diagram of an example method for verifying the functionality of a device under test.

FIG. 6 is a flow diagram, set forth by of example and not limitation, of a method ("process") 90 for verifying a DUT. In this example, process 90 begins at 92 and, in an operation 94, code segments are automatically developed by, for example, a software VIP module that represent a series of firmware test patterns. Next, in an operation 96, the code segments representing the series of firmware test patterns are loaded into a digital memory of the DUT. In an operation 98, the execution of the code segments by logic of the DUT is monitored and, in an operation 100 it is determined if the test patterns should be modified. If they are to be modified, process control is then returned to operation 96. If the test patterns are not to be modified, an operation 102 determines if the firmware testing is complete. If so, the process 90 ends at 104 and, if not, control returns to operation.

It will be appreciated that in certain non-limiting examples that a Firmware UVC is a type of verification IP that provides software sub-routines to create random sequences of instructions, checks the validity of those instruction sequences, and then measures their coverage in simulations. It follows the UVM methodology and the structure of the IP is fully UVM compliant. This enables the VIP module to be instantiated and used in a UVM environment like a standard UVC, thus promoting reuse.

It should be again noted that any design that uses a microprocessor can use a Firmware UVC to create generic function calls based on instruction sets. That is, the microprocessor can, in certain non-limiting examples, develop random and/or directed UVM sequences based on these function calls to verify the accuracy of the design.

It should also be noted that example Firmware UVC can also generate assembly code, process it, and create an output file containing memory information to be preloaded into simulations. It can generate random instructions and convert them into the address, data, and control information needed to drive each memory port. It can have a driver and/or a monitor to check the validity of instructions and hence can be used in either active or passive mode.

Although various embodiments have been described using specific terms and devices, such description is for illustrative purposes only. The words used are words of description rather than of limitation. In addition, it should be understood that aspects of various other embodiments may be interchanged either in whole or in part. It is to be understood that changes and variations may be made by those of ordinary skill in the art without departing from the spirit or the scope of various inventions supported by the written disclosure and the drawings.

What is claimed is:

1. A device verification system comprising:
 a device under test (DUT) including digital logic and a plurality of digital memories coupled to the digital logic;
 a plurality of hardware Verification Intellectual Property (VIP) modules coupled to the DUT to verify hardware of the DUT; and
 a plurality of software VIP modules coupled to the DUT to verify firmware of the DUT, wherein the software VIP modules are implemented as Firmware Universal Verification Components (UVCs) that are compliant with Universal Verification Methodology (UVM), where the software VIP modules that are implemented as Firmware UVCs are instantiated and used in a UVM environment like a traditional UVC, where each UVC includes a Master Agent, an Interface coupled to the Master Agent, and a Master Sequence Library, and wherein the Master Agent includes a Sequencer receiving packets from the Master Sequence Library, a Driver receiving packets from the Sequencer, a Config Block and a Monitor, whereby each Firmware UVC provides subroutines to create random sequences of firmware instructions, checks the validity of those instruction sequences, and then measures their coverage in simulation.

2. A device verification system as recited in claim 1 wherein the digital logic comprises a microprocessor.

3. A device verification system as recited in claim 2 wherein the plurality of memories includes a plurality of non-volatile memories.

4. A device verification system as recited in claim 3 wherein the plurality of non-volatile memories include a Flash memory and a read-only memory (ROM).

5. A device verification system as recited in claim 4 wherein the plurality of memories further includes a volatile memory.

6. A device verification system as recited in claim 5 wherein the volatile memory is a random access memory (RAM).

7. A device verification system as recited in claim 6 wherein the hardware VIP modules comprise peripherals of the DUT.

8. A device verification system as recited in claim 7 wherein the plurality of VIP modules include at least one of a I2C VIP module, a SPI VIP module, a JTAG VIP module, and a AHB Master/Slave VIP module.

9. A device verification system comprising:
 a device under test (DUT);
 an Interface UVC coupled to the DUT;
 a Test Bench & Handshake component coupled to the DUT and the Interface UVC;
 a Reference Model component coupled to the DUT and the Interface UVC;
 a Firmware UVC, compliant with Universal Verification Methodology (UVM), coupled to the Test Bench & Handshake component, the DUT and the Reference Model component, wherein the Firmware UVC includes a Master Agent, an Interface coupled to the Master Agent, and a Master Sequence Library, and wherein the Master Agent includes a Sequencer receiving packets from the Master Sequence Library, a Driver receiving packets from the Sequencer, a Config Block and a Monitor, wherein the Firmware UVC is instantiated and used in a UVM environment like a traditional UVC and provides subroutines to create random sequences of firmware instructions, checks the validity of those instruction sequences, and then measures their coverage in simulation; and
 a Coverage component coupled to the Firmware UVC.

10. A device notification system as recited in claim 9 wherein the Driver module and the Monitor module receive data via the Master Agent system interface.

11. A method for verifying the functionality of a device under test comprising:
 a) automatically developing code segments representing a series of firmware test patterns with a software Verification Intellectual Property (VIP) module, wherein the software VIP module is implemented as a Firmware Universal Verification Component (UVC) that is compliant with Universal Verification Methodology (UVM), where the software VIP modules that are implemented as Firmware UVCs are instantiated and used in a UVM environment like a traditional UVC, where each UVC includes a Master Agent, an Interface coupled to the Master Agent, and a Master Sequence Library, and wherein the Master Agent includes a Sequencer receiving packets from the Master Sequence Library, a Driver receiving packets from the Sequencer, a Config Block and a Monitor, whereby the Firmware UVC provides subroutines to create random sequences of firmware instructions, checks the validity of those instruction sequences, and then measures their coverage in simulation;
 b) transferring code segments representing the series of firmware test patterns into a digital memory of a device under test (DUT) that includes digital logic; and
 c) monitoring the functional operation of the DUT as it uses the digital logic to execute the code segments representing the series of firmware test patterns stored in digital memory.

12. A method for verifying the functionality of a device under test as recited in claim 11 wherein the UVM is reactive and/or adaptive, such that the test patterns are changed dynamically based upon DUT response.

* * * * *